United States Patent
Alexandersson

(10) Patent No.: US 10,394,428 B2
(45) Date of Patent: Aug. 27, 2019

(54) METHOD AND ELECTRONIC DEVICE FOR MANIPULATING A FIRST OR A SECOND USER INTERFACE OBJECT

(75) Inventor: Petter Alexandersson, Bjarred (SE)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 14/349,838

(22) PCT Filed: Oct. 6, 2011

(86) PCT No.: PCT/EP2011/067457
§ 371 (c)(1),
(2), (4) Date: Jun. 9, 2014

(87) PCT Pub. No.: WO2013/050077
PCT Pub. Date: Apr. 11, 2013

(65) Prior Publication Data
US 2014/0304599 A1   Oct. 9, 2014

(51) Int. Cl.
*G06F 3/0488* (2013.01)
*G06F 3/0486* (2013.01)
*G06F 3/0484* (2013.01)
*G06F 3/041* (2006.01)
*G06F 3/16* (2006.01)

(52) U.S. Cl.
CPC ........ *G06F 3/04842* (2013.01); *G06F 3/0414* (2013.01); *G06F 3/0486* (2013.01); *G06F 3/0488* (2013.01); *G06F 3/165* (2013.01)

(58) Field of Classification Search
None
See application file for complete search history.

(56) References Cited

U.S. PATENT DOCUMENTS

| 5,530,865 A * | 6/1996 | Owens | G06F 3/0486 715/203 |
| 5,608,860 A * | 3/1997 | Fitzpatrick | G06F 3/0486 345/902 |
| 5,764,873 A * | 6/1998 | Magid | G06F 3/0486 715/769 |

(Continued)

FOREIGN PATENT DOCUMENTS

| AU | 2003203702 | 10/2004 |
| CN | 101223496 | 7/2008 |

OTHER PUBLICATIONS

Translated Office Action for corresponding Chinese application No. 201180073991.0 dated Apr. 18, 2016, 8 pages.

*Primary Examiner* — Yongjia Pan
(74) *Attorney, Agent, or Firm* — Myers Bigel, P. A.

(57) ABSTRACT

A method and an electronic device for manipulating a first user interface object are provided. The electronic device is capable of detecting a first type of touch on a touch screen of the electronic device and a second type of touch on the touch screen. The electronic device detects a first touch of the first type at the first user interface object. The electronic device sets the first user interface object to a first state in response to the detection of the first touch. Next, the electronic device detects a second touch of the first type at a second user interface object. Then, the electronic device manipulates the first or second user interface object based on properties of the first and second user interface objects in response to the detection of the second touch.

18 Claims, 4 Drawing Sheets

(56) References Cited

U.S. PATENT DOCUMENTS

| | | | | |
|---|---|---|---|---|
| 5,867,144 A * | 2/1999 | Wyard | G06F 3/0486 | 715/255 |
| 6,005,570 A * | 12/1999 | Gayraud | G06F 3/04895 | 715/709 |
| 6,545,669 B1 * | 4/2003 | Kinawi | G06F 3/0486 | 345/1.1 |
| 6,590,568 B1 | 7/2003 | Astala et al. | | |
| 6,807,668 B2 * | 10/2004 | Stern | G06F 9/4443 | 715/769 |
| 7,757,180 B2 * | 7/2010 | Nakai | G06F 3/0486 | 715/769 |
| 8,127,240 B2 * | 2/2012 | Grotjohn | G06F 3/04817 | 715/769 |
| 8,269,736 B2 * | 9/2012 | Wilairat | G06F 3/04883 | 345/173 |
| 8,788,979 B2 * | 7/2014 | Osman | G06F 3/0481 | 715/863 |
| 8,793,605 B2 * | 7/2014 | Szeto | G06F 3/0486 | 715/764 |
| 8,806,364 B2 * | 8/2014 | Hwang | G06F 3/0488 | 715/788 |
| 8,832,578 B1 * | 9/2014 | Shah | G06F 9/543 | 715/222 |
| 8,924,858 B2 * | 12/2014 | Mistry | G06F 3/0486 | 715/748 |
| 8,954,887 B1 * | 2/2015 | Tseng | G06F 3/04812 | 715/808 |
| 9,411,504 B2 * | 8/2016 | Hinckley | G06F 3/04883 | |
| 9,454,304 B2 * | 9/2016 | Hinckley | G06F 3/0483 | |
| 9,507,520 B2 * | 11/2016 | Koenig | G06F 3/04886 | |
| 9,519,356 B2 * | 12/2016 | Hinckley | G06F 3/033 | |
| 2003/0122779 A1 * | 7/2003 | Martin | G06F 1/1662 | 345/156 |
| 2003/0160825 A1 * | 8/2003 | Weber | G06F 3/0486 | 715/769 |
| 2003/0222915 A1 * | 12/2003 | Marion | G06F 3/0486 | 715/769 |
| 2004/0095390 A1 * | 5/2004 | Arning | G06F 3/0486 | 715/769 |
| 2005/0166159 A1 | 7/2005 | Mondry et al. | | |
| 2006/0070007 A1 * | 3/2006 | Cummins | G06F 17/30398 | 715/769 |
| 2006/0136833 A1 * | 6/2006 | Dettinger | G06F 3/0486 | 715/769 |
| 2006/0274044 A1 * | 12/2006 | Gikandi | G06F 3/03543 | 345/163 |
| 2007/0198561 A1 * | 8/2007 | Lee | G06F 3/0483 | |
| 2008/0077264 A1 * | 3/2008 | Irvin | G06F 17/30749 | 700/94 |
| 2009/0006959 A1 * | 1/2009 | Kalenius | G06F 3/0489 | 715/710 |
| 2009/0201528 A1 * | 8/2009 | Truong | G06F 3/1205 | 358/1.15 |
| 2010/0295795 A1 * | 11/2010 | Wilairat | G06F 3/04883 | 345/173 |
| 2011/0161807 A1 | 6/2011 | Choi et al. | | |
| 2011/0193785 A1 * | 8/2011 | Russell | G06F 3/04883 | 345/173 |
| 2011/0209058 A1 * | 8/2011 | Hinckley | G06F 3/04883 | 715/702 |
| 2012/0030566 A1 * | 2/2012 | Victor | G06F 3/0482 | 715/702 |
| 2012/0182296 A1 * | 7/2012 | Han | G06F 3/04883 | 345/419 |
| 2014/0240255 A1 * | 8/2014 | Kim | G06F 3/0488 | 345/173 |

* cited by examiner

METHOD AND ELECTRONIC DEVICE FOR MANIPULATING A FIRST OR A SECOND USER INTERFACE OBJECT

RELATED APPLICATIONS

The present application is a 35 U.S.C. § 371 national phase application of PCT International Application No. PCT/EP2011/067457, filed 6 Oct. 2011, the disclosure of which is hereby incorporated herein by reference in its entirety. PCT International Application No. PCT/EP2011/067457 is published in English as International Publication No. WO 2013/050077 A1.

TECHNICAL FIELD

The present disclosure relates to the field of user interface technologies for an electronic device comprising a touch screen. More particularly, the present disclosure relates to a method and an electronic device for manipulating a first user interface object.

BACKGROUND

A known user interface technology, commonly referred to as drag-and-drop, allows a user of a computer to move files between different folders in a file system in a user friendly manner as compared to use of command line instructions. Other uses of drag-and-drop include addition of a music track to a playlist, moving of text within a word processing application and more. Typically, the user uses a mouse, or similar pointing device, connected to the computer for manipulating the file, or other user interface objects, such as music tracks, text or the like.

For the example of moving files above, the user first clicks an icon representing the file and then the user presses and holds a button of the mouse when pointing at the file. Next, the user drags the file to a desired location and then the user releases the button of the mouse to complete the move of the file. In this manner, the user is able to move user interface objects in a manner that is similar to moving objects, such as piles of paper, binders and the like, on a desk. A disadvantage of drag-and-drop is that the user is required to press and hold the mouse button. Pressing and holding may be cumbersome when simultaneously moving the mouse.

Another known user interface technology, commonly referred to as cut-and-paste, allows the user to move files between different folders. Additional uses of cut-and-paste include adding music tracks to a playlist, moving text within a word processing application and more.

By means of cut-and-paste a file can be moved as described in the following. The user clicks, typically a so called left-click, on an icon representing the file and then the user clicks the file again, but this time the user uses another kind of click, typically a so called right-click. Now, a menu displaying for example "cut" is shown to the user. As a next step, the user cuts out the file by left-clicking on "cut". After the user has found a location to which the file is to be moved, the user right-clicks at this location. In response thereto, a menu displaying for example "paste" is shown to the user. When the user clicks on "paste", a paste action is performed, i.e. the file cut out with the "cut" command is copied to the location and deleted from its original location. In this manner, the move of the file is completed. A disadvantage of cut-and-paste is that the user needs to remember what has been cut while finding the location for the paste action.

A known electronic device, such a cellular phone, comprises a touch screen. By means of the touch screen, the user is able to manipulate user interface objects displayed on the touch screen. User interface technologies, such as drag-and-drop and cut-and-paste, may be problematic to implement in the electronic device since the electronic device is typically be operated without a mouse, since the touch screen provides a possibility to manipulate user interface objects.

SUMMARY

According to an aspect, there is provided a method in an electronic device for manipulating a first user interface object. The electronic device comprises a touch screen. The electronic device is capable of detecting a first type of touch on the touch screen and a second type of touch on the touch screen. Touches of the first type exert the touch screen to forces that are greater than forces exerted to the touch screen by touches of the second type. The forces of the first and second types of touches are applied to the touch screen along a direction that is perpendicular to a plane of the touch screen. The electronic device detects a first touch of the first type at the first user interface object. Then, the electronic device sets the first user interface object to a first state in response to the detection of the first touch. The electronic device detects a second touch of the first type at a second user interface object. Next, the electronic device manipulates the first or second user interface object based on properties of the first and second user interface objects in response to the detection of the second touch.

According to another aspect, there is provided an electronic device for manipulating a first user interface object. The electronic device is capable of detecting a first type of touch on the touch screen and a second type of touch on the touch screen. Touches of the first type exert the touch screen to forces that are greater than forces exerted to the touch screen by touches of the second type. The forces of the first and second types of touches are applied to the touch screen along a direction that is perpendicular to a plane of the touch screen. The electronic device comprises a touch screen configured to display user interface objects. Moreover, the electronic device comprises a processing circuit configured to manage display of the user interface objects at the touch screen. The processing circuit is further configured to detect a first touch of the first type at the first user interface object. Additionally, the processing circuit is configured to set the first user interface object to a first state in response to the detection of the first touch. The processing circuit is further configured to detect a second touch of the first type at a second user interface object and to manipulate the first or second user interface object based on properties of the first and second user interface objects in response to the detection of the second touch.

An advantage is that the user is able to manipulate user interface objects in a user friendly manner, e.g. without the need for remembering contents of a clipboard of the electronic device or need for pressing and holding at a user interface object.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1A:
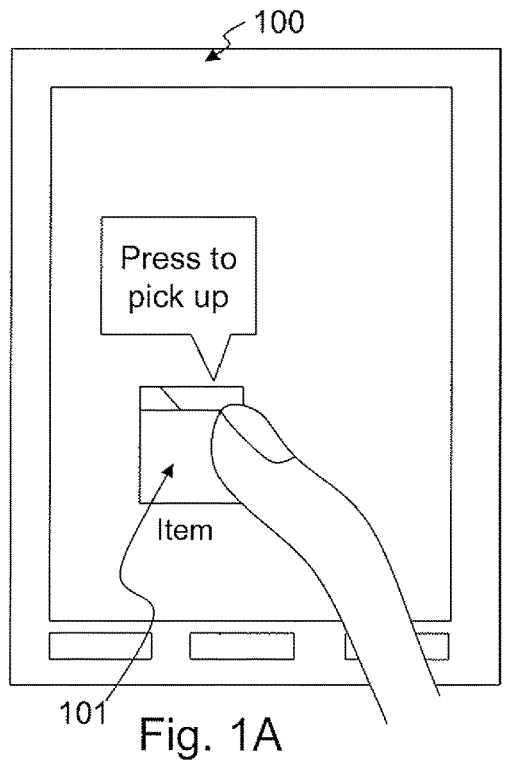
FIG. 1A-1I show schematic block diagrams of an exemplifying electronic device when the user picks up an item, drops the item, adds a further item and selects one out of two items for managing thereof.

Throughout the following description similar reference numerals have been used to denote similar elements, network nodes, parts, items or features, when applicable. In the Figures, features that appear in some embodiments are indicated by dashed lines.

As used herein, an electronic device may be a user equipment, a mobile phone, a cellular phone, a Personal Digital Assistant (PDA) equipped with radio communication capabilities, a smartphone, a tablet, a table PC, a Personal Computer (PC) with a touch screen, a portable electronic device, a portable electronic radio communication device, a touch pad or the like. Specifically, each of the exemplifying devices listed above comprises a touch screen.

As used herein, the expression "press" is exemplified by "hard press", "a press action", "a touch of a first type" and the like. Press is herein intended to denote an action performed by the user. For example, the press action is different from a tap action. Typically, the force exerted to the touch screen is greater for the press action than for the tap action.

As used herein, the expression "slide" indicates that for example a user slides a finger across the touch screen. Such slide typically exerts a force in the same range as the tap action.

As used herein, the expression "hint" indicates that a rectangle, such as a window, may display informative text or informative symbols to the user of the electronic device.

FIG. 1A-1I show schematic block diagrams of an exemplifying electronic device in different situations such as when the user picks up a first item 101, drops the item 101, adds a second item 102 and selects one out of these two items for managing thereof. As an example, the first item 101 may be a file, a music track, a portion of text, an image file or the like. Generally, the first item 101 indicates user content. The user content may for example be downloaded, created or edited by the user.

The exemplifying electronic device comprises a touch screen. The touch screen may be any type of screen, or display device, capable of detecting tactile input from a user. The electronic device 100 may display user interface objects (UIOs) on the touch screen.

In some examples, the electronic device comprises a clipboard memory. The clipboard memory may be a separate memory or a portion of any kind of general purpose memory. The memory may be a hard disk, a magnetic storage medium, a portable computer diskette or disc, flash memory, random access memory (RAM) or the like. Furthermore, the memory may be an internal register memory of a processor comprised in the electronic device.

In the following, nonlimiting examples of the methods performed in the electronic device will be described with reference to FIG. 1A through FIG. 1I.

In FIG. 1A, the user slides his/her finger across the touch screen of the electronic device. As the user slides his/her finger across the touch screen, a hint is displayed. The hint may comprise a text, such as "press to pick up", in order to inform the user about that the first item 101 may be picked up by pressing the first item 101.

Figure 1B:
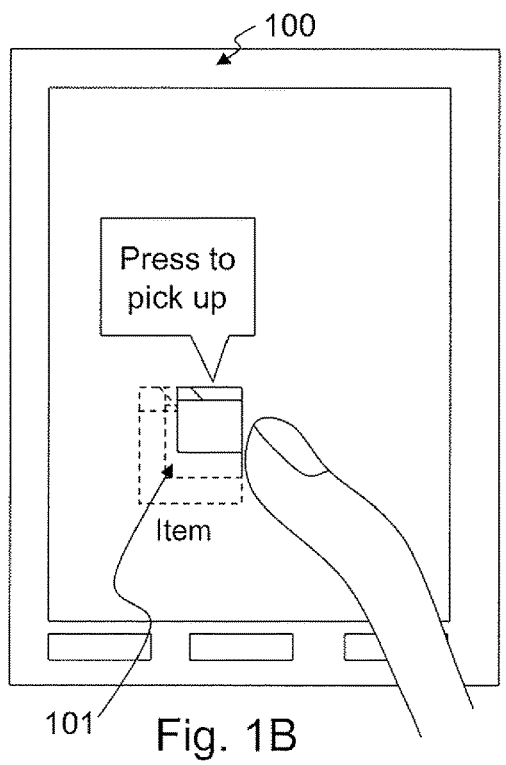

In FIG. 1B, the electronic device 100 detects a first press on the touch screen when the user presses the first item 101. In some examples, the first item 101 shrinks to indicate that the first item 101 has been picked by the user. Metaphorically speaking, the first item 101 sticks to for example the finger of the user. The finger may of course be replaced by any other pointing device, such as a pen or the like.

Figure 1C:
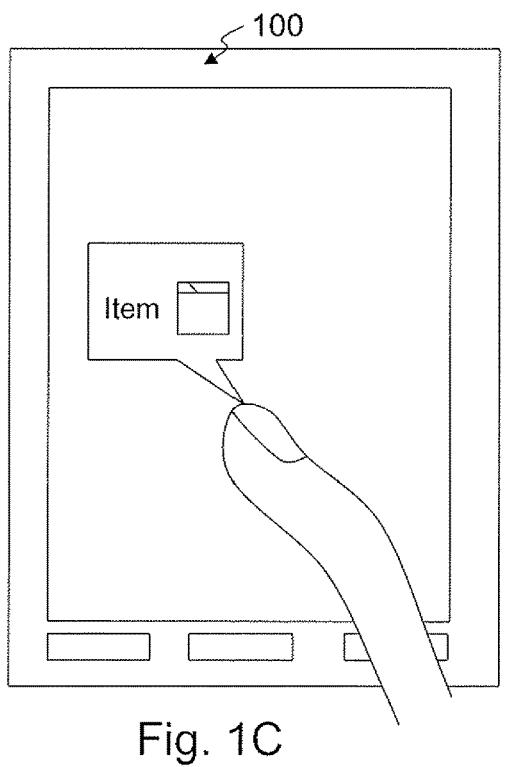

In FIG. 1C, the electronic device 100 displays a hint in response to that the user taps, by means of a first tap, the touch screen. The hint indicates, or shows, the first item 101 that was picked as described with reference to FIG. 1B. Hence, the user is reminded about what item he/she has picked up. Expressed differently, the user is reminded about what item has been stuck to the finger. FIG. 1C may show that the user slides his/her finger across the screen while the hint is displayed. The hint may follow the position indicated by the finger, i.e. the display, or showing, of the hint is continuously moved and the position thereof is updated.

Figure 1D:
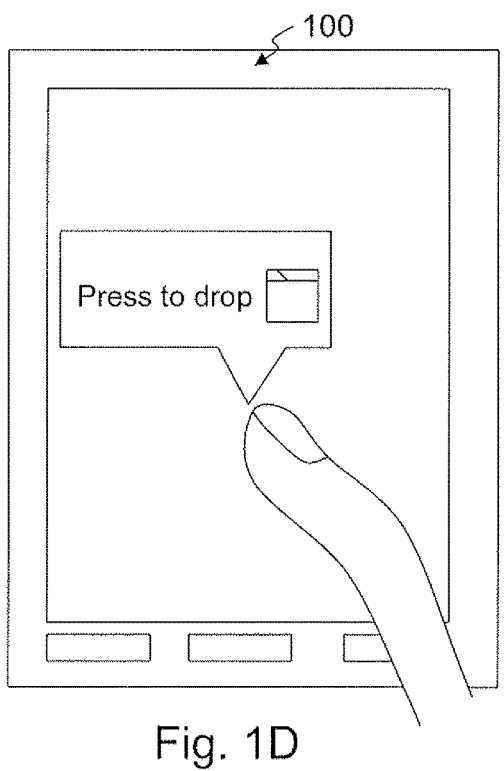

In FIG. 1D, the electronic device 100 displays a hint. The hint may show a text, such as "press to drop" for indicating to the user that the user may press the touch screen to drop the first item 101. The hint in FIG. 1C has informed the user about that the first item 101 was picked in case this has been forgotten by the user. The first item 101 may be comprised in the clipboard memory of the electronic device.

Figure 1E:
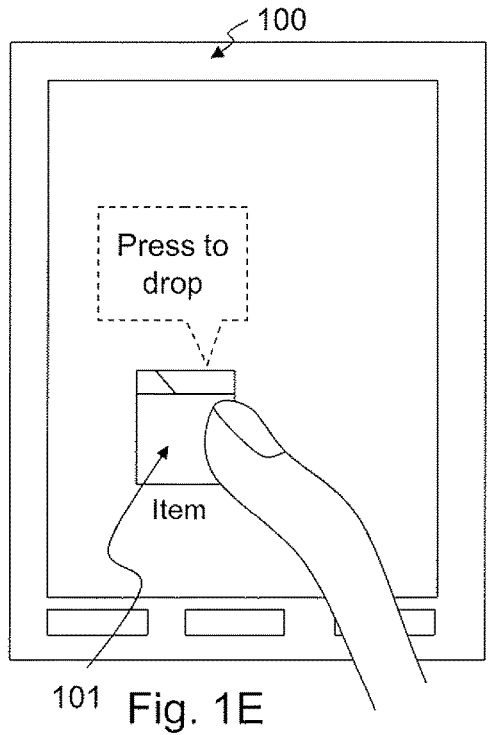

In FIG. 1E, the electronic device 100 detects a second press at the touch screen at a location where the first item 101 may be dropped. For example, if the first item 101 is a file the location may be a folder in which case the file is copied or moved to said folder. In case the location is occupied by an application icon representing a program, installed in the electronic device, the electronic device opens the file while using the program. Needless to say, the electronic device checks that the program and the file are compatible, i.e. that it is possible, and makes sense, to use the program for opening the file.

It shall be noted that the location is within some user interface object, the category of which determines the outcome, such as drop or pick, of the second press. Categories will be explained in more detail below.

Figure 1F:
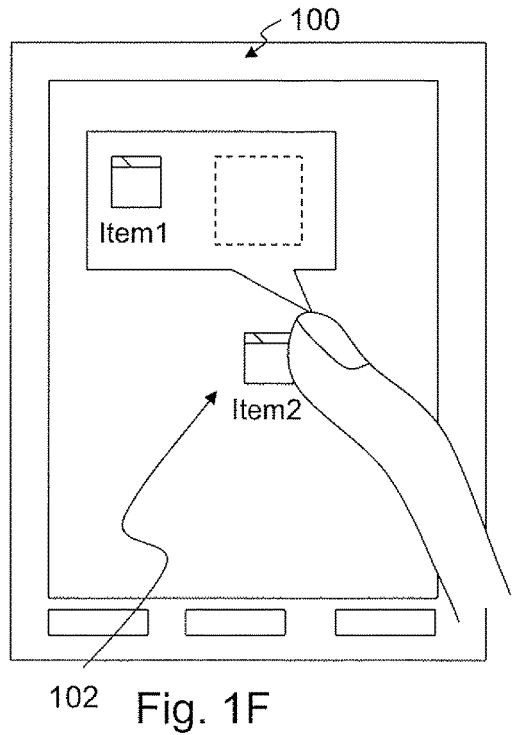
Figure 1G:
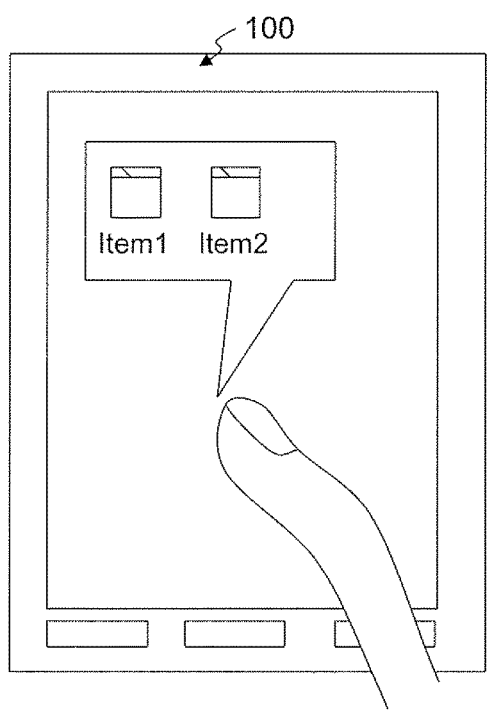

In FIG. 1F, an addition of a second item 102 is illustrated. Typically, the action illustrated in FIG. 1F may be performed after the situation shown in FIG. 1O, in which situation the electronic device 100 initially has pick up a first item 101. In more detail, the user has instructed, via the touch screen, the electronic device to pick up the first item 101 as in FIG. 1B. FIG. 1F shows that the electronic device 100 detects a third press at the second item 102. Since the electronic device detects that the first item 101 can not be dropped at the second item 102, the electronic device 100 picks up the second item 102 as well in response to the third press. Now, the electronic device 100 has picked two items, i.e. the first and second items 101, 102. Again, a hint may be displayed as shown in FIG. 1G. The hint may show the contents of the clipboard memory, i.e. in this example the first and second items 101, 102.

In FIG. 1G, the electronic device 100 displays a hint showing the first and second items 101, 102 which previously have been picked by the user. The hint may be displayed in response to that the electronic device 100 detects a second tap on the touch screen. It may be that the hint is only displayed when a location of the second tap is suitable for dropping. This action is similar to the action shown in FIG. 1O. However, it is preferred that the hint in FIG. 1G is not continuously moved. Generally, FIG. 1H illustrates that the electronic device displays a hint in response to the third press, whereby the user is able to press one item out of the first and second items 101, 102, which item is to be dropped.

Figure 1H:
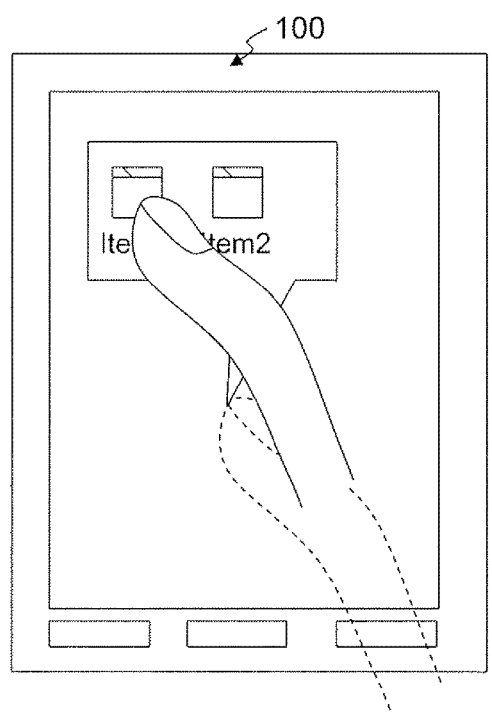

In FIG. 1H, the electronic device 100 detects a fourth press at the touch screen. In response to the detection of the fourth press, the electronic device 100 drops the first or second item 101, 102. The location, or position, of the fourth press, determines whether the first or second item 101, 102 is to be dropped. Expressed differently, the first item 101 is dropped when the fourth press is at, i.e. within an area of, the first item 101, and the second item 102 is dropped when the fourth press is at the second item 102.

Figure 1I:
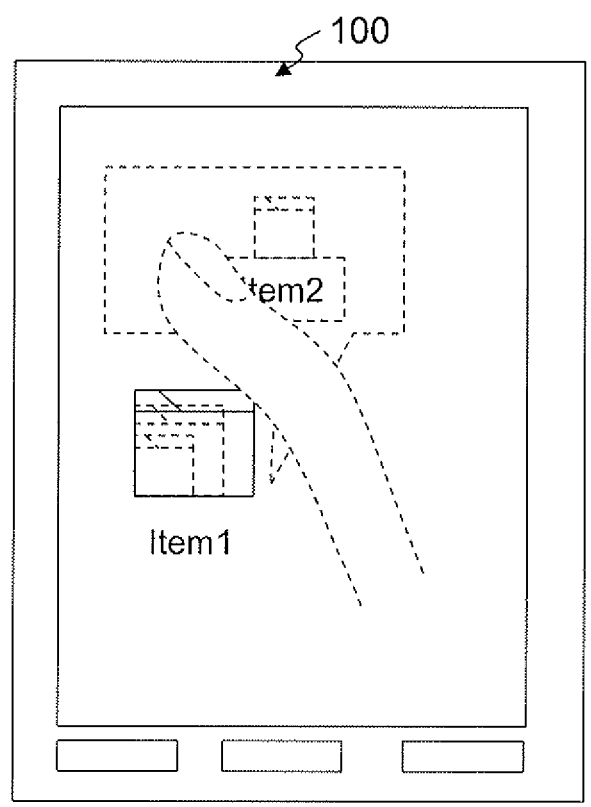

In FIG. 1I, the electronic device 100 drops the item, such as the first or second item 101, 102, pressed, by means of the fourth press, by the user in FIG. 1H. This action is similar to the action illustrated in FIG. 1E. The second tap in FIG. 1G determines where the item pressed at by the fourth press in FIG. 1H is to be dropped.

Figure 2:
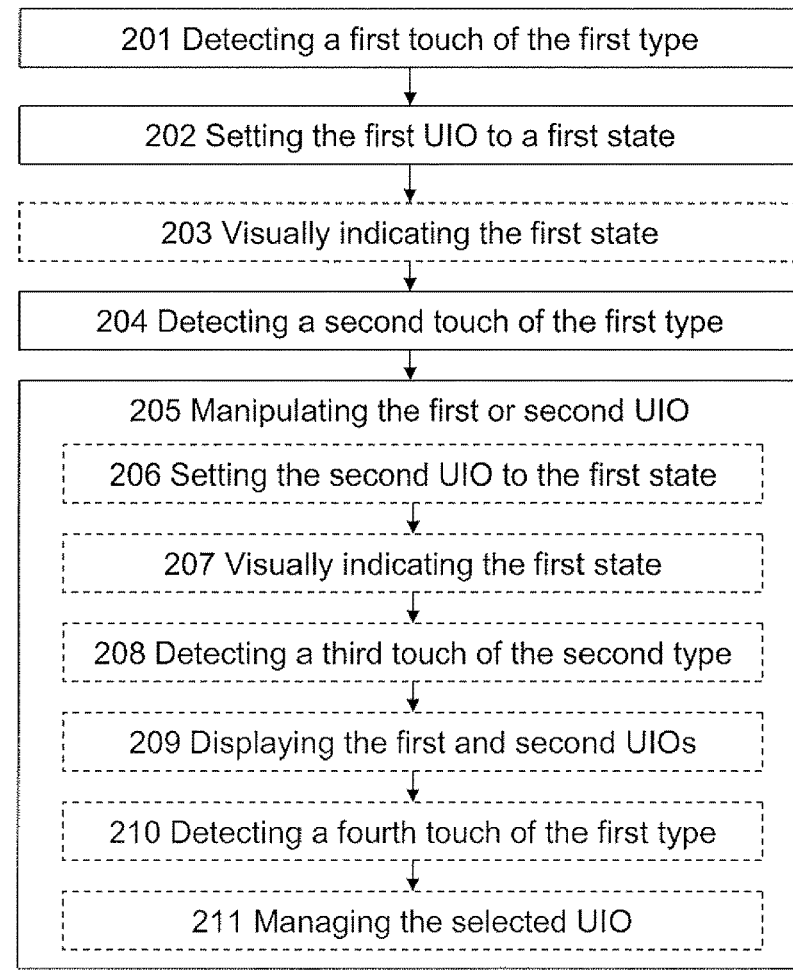
FIG. 2 shows a schematic flowchart of exemplifying methods performed by the electronic device.

FIG. 2 shows a schematic flowchart of exemplifying methods performed by the electronic device 100. The electronic device 100 performs a method for manipulating a first user interface object, such as a file, an icon representing items indicating user content or the like. As mentioned, the electronic device 100 comprises a touch screen. Furthermore, the electronic device 100 is capable of detecting a first type of touch on the touch screen and a second type of touch on the touch screen. As an example, the first type of touch may be a press, a press action, a hard press, a hard touch or the like. As an example, the second type of touch may be a tap or the like. Touches of the first type exert the touch screen to forces that are greater than forces exerted to the touch screen by touches of the second type. The forces of the first and second types of touches are applied to the touch screen along a direction that is perpendicular to a plane of the touch screen. In the literature, the first force may be referred to as a Z-force. It shall be noted that a general force applied at an arbitrary angle with respect to the plane of the touch screen always comprises a component, e.g. a force component, that is perpendicular to the plane of the touch screen.

In some embodiments, the electronic device 100 is a portable electronic device or the like as mentioned above.

In some embodiments, the first user interface object is associated to a first category of user interface objects, which user interface objects indicate user content. Examples of user interface objects indicating user content are files, music tracks, text, images, documents, sound files and the like. Hence, these examples are user interface objects of the first category. It may be noted that a key pad, or a virtual key pad, displayed on the touch screen can not be manipulated as described herein, because a key of a key pad does not indicate user content. Moreover, such key can typically not be moved from one location to another location. Therefore, a key of a key pad is not a user interface object of the first category.

In some embodiments, user interface objects associated to a second category of user interface objects manage user content.

The following actions may be performed. Notably, in some embodiments of the method the order of the actions may differ from what is indicated below.
Action 201
This action corresponds to the action illustrated in FIG. 1B, in particular the detection of the first press.

The electronic device 100 detects a first touch of the first type, such as the first press, at the first user interface object.

As an example, the first touch is at the first user interface object (UIO), when the first touch is within an area of the first user interface object. The first user interface object may be the first item 101.

When the first touch has been detected, the first interface object may be said to stick to for example the finger of the user. This is explained in action 202. Thus, the first user interface object may follow the actions of the user as he/she navigates through menus or the like in the electronic device 100. Typically, the user navigates while using touches of the second type, such as slides and taps on the touch screen.
Action 202
This action corresponds to the action illustrated in FIG. 1B and/or FIG. 1C. The electronic device 100 sets the first user interface object to a first state in response to the detection of the first touch. Expressed differently, the first user interface object is picked by the user. As an example, a reference to the first user interface object may be put in a clipboard memory of the electronic device 100. Alternatively, the actual first user interface object may be copied to the clipboard memory.
Action 203
This action corresponds to the action illustrated in FIG. 1B, in particular the shrinking of the item to indicate that the item has been picked.

The electronic device 100 visually indicates the first state by altering appearance of the first user interface object. As an example, the appearance is altered by shrinking the item that has been picked up, i.e. the first user interface object.

In some examples, a flag, or hint, may follow a finger of the user when sliding across the screen or the flag may appear at a point at which the user taps.
Action 204
The electronic device 100 detects a second touch of the first type at a second user interface object.

In some examples, this action corresponds to the action illustrated in FIG. 1E, in particular the detection of the second press resulting in the dropping of the item. In these examples, the second user interface object is associated to the second category. Hence, the second user interface object corresponds to the location of the second press in these examples.

In some example, this action corresponds to the action illustrated in FIG. 1F, in particular the detection of the third press resulting in the addition of an item. In these examples, the second user interface object is associated to the first category. Thus, the second user interface object corresponds to the second item in these examples.

Therefore, the second touch is the second press in some examples, and the second touch is the third press in some other examples.

As an example, the electronic device may detect a tap within an area of the second user interface object prior to the detection of the second touch. This example corresponds to the action illustrated in FIG. 1C, in particular the showing, or display, of the hint indicating the contents of the clipboard.
Action 205
This action corresponds to the action illustrated in FIG. 1E and FIG. 1I.

The electronic device 100 manipulates the first or second user interface object based on properties of the first and second user interface objects in response to the detection of the second touch. The first category and the second category are examples of properties of the first and/or second user interface object. In some examples, the electronic device 100 further manipulates the first or second user interface object based on a position of the second touch, e.g. the second user interface object may specify a destination folder when copying or moving a file.

Action 206

In some embodiments, the second user interface object is associated to the first category. In these embodiments, the manipulating 205 may be performed in that the electronic device 100 sets the second user interface object to the first state in response to the detection of the second touch. As an example, the electronic device 100 adds the second user interface object to the clipboard memory of the electronic device 100. The clipboard memory may be indicated visually as shown in for example FIG. 1C and FIG. 1G.

In this manner, more than one user interface object may be selected and managed at a later stage, such as in action 211.

Action 207

This action corresponds to the action illustrated in FIG. 1B and FIG. 1C.

The electronic device 100 visually indicates the first state by altering appearance of the second user interface object. This action is similar to action 203, but here the first state relates to the second user interface object while in action 203 the first state relates to the first user interface object.

Action 208

This action corresponds to the action illustrated in FIG. 1G.

In some embodiments, the manipulating 205 is performed in that the electronic device 100 detects a third touch of the second type, such as the second tap, at a third user interface object associated to the second category. When the third user interface object is associated to the second category it means that the third user interface object is of the second category. The third user interface object is a target user interface object. Thus, dropping of the first or second user interface object is possible at the third user interface object.

The location in FIG. G may be at, or within an area of, the third user interface object.

Action 209

This action corresponds to the action illustrated in FIG. 1G.

The electronic device 100 displays, in response to the detection of the third touch as described in action 208, the first and second user interface objects such as to allow a user to select the first or second user interface object. The first and second user interface objects 101, 102 may be comprised in a hint displayed at the touch screen.

Action 210

The electronic device 100 detects a fourth touch of the first type, such as the fourth press, at the first or second user interface object, wherein the first or second user interface object is a selected user interface.

In some embodiments, the fourth touch may be preceded by detection of a slide across the touch screen.

Action 211

This action corresponds to the action illustrated in FIG. 1I.

In some embodiments when action 211 follows directly after action 205, the second user interface object is associated to a second category of user interface objects, which user interface objects manage user content, wherein the first user interface object is a selected user interface object, and wherein the second user interface object is a target user interface object. Examples of user interface objects of the second category include drop-targets, drop-containers, folders, play-lists, execution buttons or the like.

The selected user interface object may determined in response to the detection of the first touch of the first type as in action 202 or in response to the detection of the fourth touch of the first type as in action 210. Thus, the electronic device 100 has detected a touch of the first type at the selected user interface object, whereby the user indicates to the electronic device that the selected user interface object is to be managed, such as moved, copied or the like.

In some embodiments, the manipulating 205 further is performed in that the electronic device 100 manages the selected user interface object.

In some embodiments, the selected user interface object represents a file residing in a file system for managing data on a memory comprised in the electronic device 100 and the target user interface object represents a folder of the file system. The electronic device 100 manages the file by moving the file to the folder.

In some embodiments, the selected user interface object represents a music track and the target user interface object represents a play list. The electronic device 100 manages the music track by adding the music track to the play list.

In some embodiments, the selected user interface object represents an application icon and the target user interface object represents a user desktop. The electronic device 100 manages the application icon by moving the application icon to a position, indicated by the target user interface object, of the user desktop.

In some embodiments, the selected user interface object represents text in word processing application and the target user interface object represents a location for insertion of the text. The electronic device 100 manages the text by moving the text to the location for insertion, or copying the text to the location for insertion.

Figure 3:
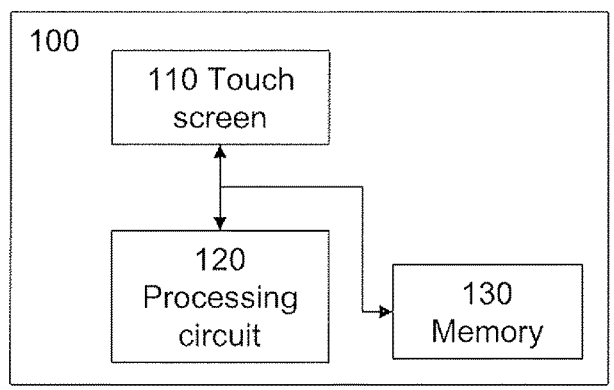
FIG. 3 shows a schematic block diagram of an exemplifying electronic device configured to perform the methods illustrated in FIG. 2.

FIG. 3 shows a schematic block diagram of an exemplifying electronic device configured to perform the methods illustrated in FIG. 2. The electronic device 100 is configured to manipulate a first user interface object. The electronic device 100 is capable of detecting a first type of touch on the touch screen and a second type of touch on the touch screen. Expressed differently, the electronic device 100 is configured to detect the first type of touch and the second type of touch. Touches of the first type exert the touch screen to forces that are greater than forces exerted to the touch screen by touches of the second type. The forces of the first and second types of touches are applied to the touch screen along a direction that is perpendicular to a plane of the touch screen.

In some embodiments of the electronic device 100, the electronic device 100 is a portable electronic device or the like as explained above.

The electronic device 100 comprises a touch screen 110 configured to display user interface objects.

Furthermore, the electronic device 100 comprises a processing circuit 120 configured to manage display, or showing, of the user interface objects at the touch screen. The processing circuit 120 further is configured to detect a first touch of the first type at the first user interface object.

Additionally, the processing circuit 120 is configured to set the first user interface object to a first state in response to the detection of the first touch. Moreover, the processing circuit 120 is configured to detect a second touch of the first type at a second user interface object and to manipulate the first or second user interface object based on properties of the first and second user interface objects in response to the detection of the second touch.

In some embodiments of the electronic device 100, the first user interface object is associated to a first category of user interface objects, which user interface objects indicate user content.

In some embodiments of the electronic device 100, the second user interface object is associated to the first category, the processing circuit 120 further is configured to set the second user interface object to the first state in response to the detection of the second touch.

In some embodiments of the electronic device 100, user interface objects associated to a second category of user interface objects manage user content.

In some embodiments of the electronic device 100, the processing circuit 120 further is configured to detect a third touch of the second type at a third user interface object associated to the second category, the third user interface object is a target user interface object, display in response to the detection of the third touch the first and second user interface objects such as to allow a user to select the first or second user interface object, and detect a fourth touch of the first type at the first or second user interface object, wherein the first or second user interface object is a selected user interface.

In some embodiments of the electronic device 100, the second user interface object is associated to a second category of user interface objects, which user interface objects manage user content, and wherein the second user interface object is a target user interface object.

In some embodiments of the electronic device 100, the processing circuit 120 is further configured to manage the selected user interface object.

In some embodiments of the electronic device 100, the selected user interface object represents a file residing in a file system for managing data on a memory comprised in the electronic device 100 and the target user interface object represents a folder of the file system. The processing circuit 120 is further configured to move the file to the folder.

In some embodiments of the electronic device 100, the selected user interface object represents a music track and the target user interface object represents a play list. The processing circuit 120 is further configured to add the music track to the play list.

In some embodiments of the electronic device 100, the selected user interface object represents an application icon and the target user interface object represents a user desktop. The processing circuit 120 is further configured to move the application icon to a position, indicated by the target user interface object, of the user desktop.

In some embodiments of the electronic device 100, the selected user interface object represents text in word processing application and the target user interface object represents a location for insertion of the text. The processing circuit 120 is further configured to move the text to the location for insertion, or copy the text to the location for insertion.

In some embodiments of the electronic device 100, the processing circuit 120 further is configured to visually indicate the first state by altering appearance of the first or second user interface object, respectively.

The processing circuit 120 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments of the electronic device 100, the electronic device 100 may further comprise a memory 130, such as the clipboard memory, for storing references to the user interface object and/or a copy of the user interface object. The user interface object may be the first or second user interface object.

The memory 130 may be used for storing software to be executed by, for example, the processing circuit. The software may comprise instructions to enable the processing circuit to perform the method in the electronic device 100 as described above in conjunction with FIG. 2. The memory 130 may be a hard disk, a magnetic storage medium, a portable computer diskette or disc, flash memory, random access memory (RAM) or the like. Furthermore, the memory may be an internal register memory of a processor.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in an electronic device, comprising a touch screen, for manipulating a first user interface object, wherein the electronic device is capable of detecting a first type of touch on the touch screen and a second type of touch on the touch screen, wherein touches of the first type exert the touch screen to forces that are greater than forces exerted to the touch screen by touches of the second type, wherein the forces of the first and second types of touches are applied to the touch screen along a direction that is perpendicular to a plane of the touch screen, wherein the method comprises:
   detecting a slide on the touch screen;
   displaying, in response to the slide, a hint that the first user interface object may be picked up;
   detecting a first touch of the first type at the first user interface object;
   setting the first user interface object to a first state in response to the detection of the first touch, wherein the first user interface object is picked up;
   detecting a tap on the touch screen;
   displaying, in response to the tap, a hint indicating or showing the first user interface object that was picked up;
   detecting a second touch of the first type at a second user interface object, wherein the first user interface object is dropped at the second user interface object; and
   manipulating the first or second user interface object based on properties of the first and second user interface objects in response to the detection of the second touch.

2. The method according to claim 1, wherein the first user interface object is associated to a first category of user interface objects, which user interface objects indicate user content.

3. The method according to claim 2, wherein the second user interface object is associated to the first category, wherein the manipulating further comprises:
   setting the second user interface object to the first state in response to the detection of the second touch.

4. The method according to claim 1, wherein user interface objects associated to a second category of user interface objects manage user content.

5. The method according to claim 4, wherein the manipulating further comprises:
   detecting a third touch of the second type at a third user interface object associated to the second category, wherein the third user interface object is a target user interface object;

displaying, in response to the detection of the third touch, the first and second user interface objects such as to allow a user to select the first or second user interface object; and detecting a fourth touch of the first type at the first or second user interface object, wherein the first or second user interface object is a selected user interface.

6. The method according to claim 1, wherein the second user interface object is associated to a second category of user interface objects, which user interface objects manage user content, wherein the first user interface object is a selected user interface object, and wherein the second user interface object is a target user interface object.

7. The method according to claim 6, wherein the manipulating further comprises:

managing the selected user interface object.

8. The method according to claim 7, wherein the selected user interface object represents a file residing in a file system for managing data on a memory comprised in the electronic device and the target user interface object represents a folder of the file system, wherein the managing further comprises moving the file to the folder.

9. The method according to claim 7, wherein the selected user interface object represents a music track and the target user interface object represents a play list, wherein the managing further comprises adding the music track to the play list.

10. The method according to claim 7, wherein the selected user Interface object represents an application icon and the target user interface object represents a user desktop, wherein the managing further comprises moving the application icon to a position, indicated by the target user interface object, of the user desktop.

11. The method according to claim 7, wherein the selected user interface object represents text in word processing application and the target user interface object represents a location for insertion of the text, wherein the managing further comprises:

moving the text to the location for insertion, or copying the text to the location for insertion.

12. The method according to claim 1, further comprising:

visually indicating the first state by altering appearance of the first or second user interface object, respectively.

13. The method according to claim 1, wherein the electronic device is a portable electronic device.

14. An electronic device for manipulating a first user interface object, wherein the electronic device is capable of detecting a first type of touch on the touch screen and a second type of touch on the touch screen, wherein touches of the first type exert the touch screen to forces that are greater than forces exerted to the touch screen by touches of the second type, wherein the forces of the first and second types of touches are applied to the touch screen along a direction that is perpendicular to a plane of the touch screen, wherein the electronic device comprises:

a touch screen configured to display user interface objects, a processing circuit configured to manage display of the user interface objects at the touch screen, wherein the processing circuit further is configured to:

detect a slide on the touch screen;

display, in response to the slide, a hint that the first user interface object may be picked up;

detect a first touch of the first type at the first user interface object;

set the first user interface object to a first state in response to the detection of the first touch, wherein the first user interface object is picked up;

detect a tap on the touch screen;

display, in response to the tap, a hint indicating or showing the first user interface object that was picked up;

detect a second touch of the first type at a second user interface object, wherein the first user interface object is dropped at the second user interface object; and manipulate the first or second user interface object based on properties of the first and second user interface objects in response to the detection of the second touch.

15. The electronic device according to claim 14, wherein the first user interface object is associated to a first category of user interface objects, which user interface objects indicate user content, wherein the second user interface object is associated to the first category, wherein the processing circuit further is configured to:

set the second user interface object to the first state in response to the detection of the second touch.

16. The electronic device according to claim 14, wherein user interface objects associated to a second category of user interface objects manage user content.

17. The electronic device according to claim 16, wherein the processing circuit further is configured to:

detect a third touch of the second type at a third user interface object associated to the second category, wherein the third user interface object is a target user interface object;

display, in response to the detection of the third touch, the first and second user interface objects such as to allow a user to select the first or second user interface object; and detect a fourth touch of the first type at the first or second user interface object, wherein the first or second user interface object is a selected user interface object.

18. A method in an electronic device, comprising a touch screen, for manipulating a first user interface object, wherein the electronic device is capable of detecting a first type of touch on the touch screen and a second type of touch on the touch screen, wherein touches of the first type exert the touch screen to forces that are greater than forces exerted to the touch screen by touches of the second type, wherein the forces of the first and second types of touches are applied to the touch screen along a direction that is perpendicular to a plane of the touch screen, wherein the method comprises:

detecting a slide on the touch screen;

displaying, in response to the slide, a hint that the first user interface object may be picked up;

detecting a first touch of the first type at the first user interface object;

setting the first user interface object to a first state in response to the detection of the first touch, wherein the first user interface object is picked up;

detecting a second touch of the first type at a second user interface object, wherein the first user interface object is dropped at the second user interface object; and manipulating the first or second user interface object based on properties of the first and second user interface objects in response to the detection of the second touch.

* * * * *